Oct. 26, 1948.  D. S. SCHOVER  2,452,156
FLOAT POSITION INDICATOR
Filed Sept. 24, 1945
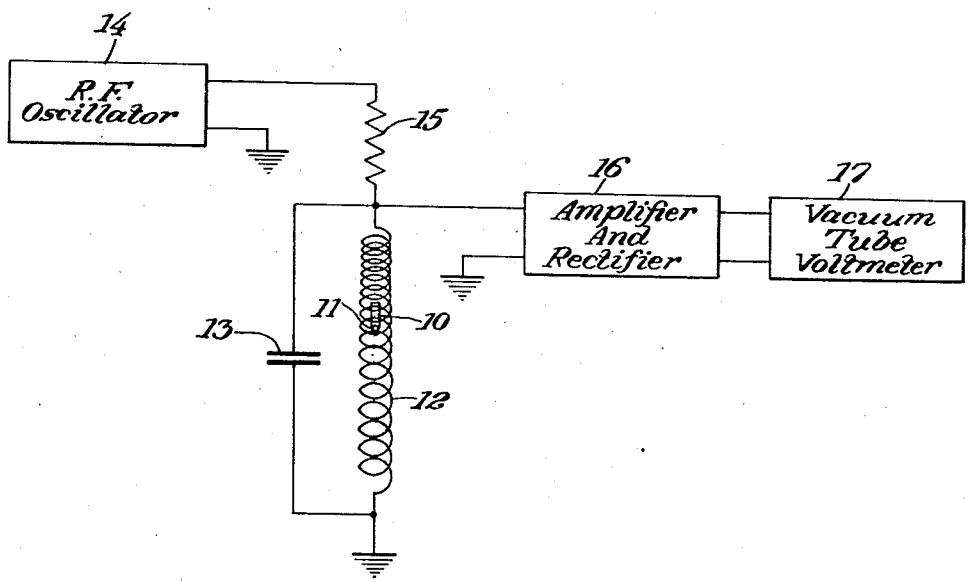
INVENTOR.
Donald S. Schover.
BY Patented Oct. 26, 1948

2,452,156

UNITED STATES PATENT OFFICE 2,452,156

FLOAT POSITION INDICATOR

Donald S. Schover, Chicago, Ill., assignor to the United States of America as represented by the United States Atomic Energy Commission Application September 24, 1945, Serial No. 618,356

5 Claims. (Cl. 177—351)

The present invention relates to a device for indicating at a distance the position of a float member or the like, and particularly to such a device in which the float member includes a small metallic body arranged to move with the float member so as to vary the characteristics of an electrical circuit in strict accordance with changes in position of the metallic body and hence of the float.

The primary object of the present invention is to provide a remote indication of the position of a small object. Another object of the invention is to provide a sensitive circuit arrangement in which the amount of energy absorbed is a direct function of the position of the object whose position is to be indicated. Other objects and advantages of the invention will be evident from the following description when read in connection with the accompanying drawing the single figure of which shows schematically a circuit arrangement incorporating the invention.

In accordance with the invention the small body whose position is to be remotely indicated may comprise a glass ampule 10, such as known Rotameter floats, provided with a small metal tip 11 of any suitable metal, either magnetic or non-magnetic, such as stainless steel, copper, etc. Such floats are well known for indicating the rate of flow of a fluid although it is to be understood the invention is equally applicable to the indication of the level of a liquid and the like.

The path of travel of the float 10 is surrounded with a coil 12 so wound that its inductance varies monotonically along its length, i. e. the number of turns per unit length increases from one end to the other. The coil 12 is shunted by a condenser 13 of the proper capacitance to provide a circuit tuned to the frequency of a radio frequency oscillator 14 the output of which is fed to the tuned circuit through a resistance 15. The resonant circuit comprised of the condenser 13 and the inductance 12 is thus traversed by a high frequency alternating current of relatively large amplitude.

The displaceable metal body 11 will under these conditions absorb energy by eddy current loss to a degree dependent upon the flux intensity traversing the metal body 11. Since the tapered inductance coil 12 produces a flux intensity which increases along the length of the coil 12 it is evident that the amount of energy absorbed by the metal body 11 is a direct function of the displacement of the body 11 along the axis of the coil 12. This energy absorption causes a change of impedance and an accompanying change of I. R. drop across the resonant circuit comprised of the coil 12 and the condenser 13 so that this I. R. drop is a function of the position of the metal body 11 and hence of its supporting float member 10. This I. R. drop may be measured in any suitable manner to provide an indication of the position of the float 10. As shown in the drawing an amplifier and rectifier network 16 is connected to energize a vacuum tube voltmeter 17 in accordance with the I. R. drop across the terminals of the tapered inductance coil 12. The reading of the voltmeter 17 being an indication of the position of the float 10 may be calibrated as desired.

In the particular application for which the invention was devised the position of the float 10 varies in accordance with the rate of flow of a fluid. Thus it is in this case convenient to calibrate the voltmeter 17 in units of flow rate.

It will be evident from the above description that the present invention provides an arrangement for indicating at a distance the position of a displaceable body without affecting or impeding the displacement of the body.

It will be understood that the diagrammatic showing has been limited to only those parts which are essential for an understanding of the invention and that it is immaterial what form the force displacing the body takes as long as it is feasible to arrange to have such a body displaceable along the axis of a tapered inductance coil.

While for the purpose of illustrating the invention one embodiment has been described, many modifications will suggest themselves to those skilled in the art without departing from the invention the scope of which is pointed out in the appended claims.

I claim:

1. A remote position indicating system comprising a linearly displaceable metallic object, the position of which is to be remotely indicated, a resonant circuit including a cylindrical inductance coil and a capacitance in parallel, a source of alternating voltage applied across said resonant circuit, said coil having its axis coinciding with the displacement path of said object and having a unique inductance for each unit of its length, whereby energy absorption due to eddy current loss in said object is a function of its position along the axis of said coil, and means responsive to variations in the I. R. drop across said resonant circuit.

2. A remote position indicating system comprising a linearly displaceable metallic object, the position of which is to be remotely indicated, an inductance coil having a monotonically varying inductance per unit length and positioned to surround said object with its axis aligned along the displacement path of said object, a capacitance connected in parallel with said inductance coil to form a parallel resonant circuit, a source of alternating voltage applied across said resonant circuit and electrical means connected to said parallel resonant circuit for indicating variations in the energy loss within said coil.

3. An electrical indicating system comprising a displaceable member the displacement of which is to be indicated, said displaceable member including a non-magnetic conducting portion, an inductance coil having a monotonically varying number of turns per unit length and vertically disposed to surround said displaceable member, a capacitance connected in parallel with said inductance coil to form a parallel resonant circuit, a resistance connected in series with said resonant circuit, an alternating current oscillator connected to said resistance, and an electrical circuit, including indicating means, connected to said resonant circuit and responsive to variations in the effective resistance of said coil.

4. An electrical indicating system comprising a displaceable member the displacement of which is to be indicated, said displaceable member including a metallic portion which may or may not be of magnetic material, an inductance coil having a monotonically varying number of turns per unit length and vertically disposed to surround said displaceable member, a capacitance connected in parallel with said inductance coil to form a parallel resonant circuit, a resistance connected in series with said resonant circuit, an alternating current oscillator connected to said resistance, means for amplifying and rectifying the alternating voltage drop which appears across said resonant circuit, and a vacuum tube volt meter for indicating the rectified output from said amplifying and rectifying means.

5. An electrical indicating system comprising a displaceable member the position of which is to be indicated, a radio frequency oscillator, a resonant circuit including a condenser and an inductance coil connected to said oscillator, and means responsive to variations in the I. R. drop across said resonant circuit, the displaceable member including a metal portion movable axially of the inductance coil, and said coil having along its entire length a variable number of turns per unit length so as to provide a straight-line relationship between the I. R. drop across the resonant circuit and the position of the displaceable member.

DONALD S. SCHOVER.

REFERENCES CITED

The following references are of record in the file of this patent:

UNITED STATES PATENTS

| Number | Name | Date |
|---|---|---|
| 1,746,105 | Clench et al. | Feb. 4, 1930 |
| 2,261,815 | Thompson | Nov. 4, 1941 |

FOREIGN PATENTS

| Number | Country | Date |
|---|---|---|
| 692,455 | Germany | June 20, 1940 |
| 820,993 | France | Aug. 17, 1937 |